United States Patent
Miyake et al.

(10) Patent No.: US 10,324,337 B2
(45) Date of Patent: Jun. 18, 2019

(54) LIQUID CRYSTAL DISPLAY DEVICE

(71) Applicant: Sharp Kabushiki Kaisha, Sakai, Osaka (JP)

(72) Inventors: Isamu Miyake, Sakai (JP); Tomohiko Mori, Sakai (JP); Iichiroh Inoue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 46 days.

(21) Appl. No.: 15/465,867

(22) Filed: Mar. 22, 2017

(65) Prior Publication Data

US 2017/0192307 A1   Jul. 6, 2017

Related U.S. Application Data

(63) Continuation of application No. 13/976,603, filed as application No. PCT/JP2011/079665 on Dec. 21, 2011, now Pat. No. 9,638,960.

(30) Foreign Application Priority Data

Dec. 28, 2010   (JP) .................................. 2010-291574

(51) Int. Cl.
G02F 1/1337   (2006.01)
G02F 1/1343   (2006.01)

(52) U.S. Cl.
CPC ...... *G02F 1/133753* (2013.01); *G02F 1/1343* (2013.01); *G02F 1/134336* (2013.01); *G02F 2001/133757* (2013.01); *G02F 2001/134345* (2013.01); *G02F 2203/34* (2013.01)

(58) Field of Classification Search
CPC ......... G02F 1/133753; G02F 1/134336; G02F 1/1343; G02F 2001/133757; G02F 2001/134345; G02F 2203/34
See application file for complete search history.

(56) References Cited

U.S. PATENT DOCUMENTS

2010/0157223 A1 *  6/2010  Shin ................... G02F 1/133753
                                                          349/129
2010/0289975 A1 * 11/2010  Nakagawa ........ G02F 1/133707
                                                          349/33

OTHER PUBLICATIONS

Miyake et al., "Liquid Crystal Display Device", U.S. Appl. No. 13/976,603, filed Aug. 30, 2013.

\* cited by examiner

*Primary Examiner* — Charles S Chang
(74) *Attorney, Agent, or Firm* — Keating & Bennett, LLP

(57) ABSTRACT

A liquid crystal display device according to the present invention has a display area that includes a plurality of pixels (Px). The display area is made up of n kinds of domains (where n is an integer that is equal to or greater than two and equal to or smaller than four). The directors of the n kinds of domains define mutually different alignment directions. If the domain structure of each pixel (Px) is defined by the kinds of the domains that form the pixel (Px), the number k of the kinds of the domains that form the pixel (Px), and the arrangement of the domains in the pixel (Px), the display area includes a pixel, of which k is less than n and of which the domain structure is different from the domain structures of adjacent pixels.

7 Claims, 11 Drawing Sheets

FIG.1
(a) 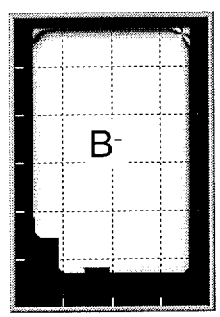
(b) 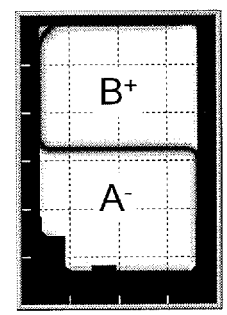
(c) 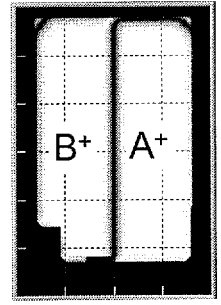
(d) 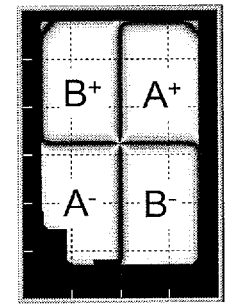

|  | Pc |  |  |  |  |  |
|---|---|---|---|---|---|---|
|  | R | G | B | R | G | B |
| SP₁ | B⁺ | A⁺ | B⁺ | A⁺ | B⁺ | A⁺ |
|  | A⁻ | B⁻ | A⁻ | B⁻ | A⁻ | B⁻ |
| SP₂ | B⁺ | A⁺ | B⁺ | A⁺ | B⁺ | A⁺ |
|  | A⁻ | B⁻ | A⁻ | B⁻ | A⁻ | B⁻ |
|  | B⁺ | A⁺ | B⁺ | A⁺ | B⁺ | A⁺ |
|  | A⁻ | B⁻ | A⁻ | B⁻ | A⁻ | B⁻ |
|  | B⁺ | A⁺ | B⁺ | A⁺ | B⁺ | A⁺ |
|  | A⁻ | B⁻ | A⁻ | B⁻ | A⁻ | B⁻ |

(b)

|  | Pc |  |  |  |  |  |
|---|---|---|---|---|---|---|
|  | R |  | G | B |  |  |
| SP₁ | B⁺ | B⁺ A⁺ | A⁺ | B⁺ | B⁺ A⁺ | A⁺ |
|  | A⁻ | A⁻ B⁻ | B⁻ | A⁻ | A⁻ B⁻ | B⁻ |
| SP₂ | B⁺ | B⁺ A⁺ | A⁺ | B⁺ | B⁺ A⁺ | A⁺ |
|  | A⁻ | A⁻ B⁻ | B⁻ | A⁻ | A⁻ B⁻ | B⁻ |
|  | B⁺ | B⁺ A⁺ | A⁺ | B⁺ | B⁺ A⁺ | A⁺ |
|  | A⁻ | A⁻ B⁻ | B⁻ | A⁻ | A⁻ B⁻ | B⁻ |
|  | B⁺ | B⁺ A⁺ | A⁺ | B⁺ | B⁺ A⁺ | A⁺ |
|  | A⁻ | A⁻ B⁻ | B⁻ | A⁻ | A⁻ B⁻ | B⁻ |

| | Pc | | | |
|---|---|---|---|---|
| | R | G | B | Ye |

Px:
| $B^+$ | $A^+$ | $B^+$ | $A^+$ | $A^+$ | $B^+$ | $A^+$ | $B^+$ |
| $A^-$ | $B^-$ | $A^-$ | $B^-$ | $B^-$ | $A^-$ | $B^-$ | $A^-$ |
| $B^+$ | $A^+$ | $B^+$ | $A^+$ | $A^+$ | $B^+$ | $A^+$ | $B^+$ |
| $A^-$ | $B^-$ | $A^-$ | $B^-$ | $B^-$ | $A^-$ | $B^-$ | $A^-$ |

(b)

| | Pc | | | |
|---|---|---|---|---|
| | R | G | B | Ye |

Px:
| $B^+$ | $A^+$ | $B^+$ | $A^+$ | $B^+$ | $A^+$ | $B^+$ | $A^+$ | $B^+$ | $A^+$ | $B^+$ | $A^+$ | $B^+$ | $A^+$ | $B^+$ | $A^+$ |
| $A^-$ | $B^-$ | $A^-$ | $B^-$ | $A^-$ | $B^-$ | $A^-$ | $B^-$ | $A^-$ | $B^-$ | $A^-$ | $B^-$ | $A^-$ | $B^-$ | $A^-$ | $B^-$ |

(c)

| | Pc | | | |
|---|---|---|---|---|
| | R | G | B | Ye |

Px:
| $B^+$ | $B^+$ | $B^+$ | $B^+$ | $A^+$ | $A^+$ | $A^+$ | $A^+$ |
| $A^-$ | $A^-$ | $A^-$ | $A^-$ | $B^-$ | $B^-$ | $B^-$ | $B^-$ |
| $B^+$ | $B^+$ | $B^+$ | $B^+$ | $A^+$ | $A^+$ | $A^+$ | $A^+$ |
| $A^-$ | $A^-$ | $A^-$ | $A^-$ | $B^-$ | $B^-$ | $B^-$ | $B^-$ |

(d)

| | Pc | | | |
|---|---|---|---|---|
| | R | G | B | Ye |

|  | Pc | | W | |
|---|---|---|---|---|
|  | R | G | | |
| Px { | B⁺ | B⁺ | A⁺ | A⁺ |
|  | A⁻ | A⁻ | B⁻ | B⁻ |
| Px { | B⁺ | B⁺ | A⁺ | A⁺ |
|  | A⁻ | A⁻ | B⁻ | B⁻ |
| B | B⁺ | B⁺ | A⁺ | A⁺ |
|  | A⁻ | A⁻ | B⁻ | B⁻ |
|  | B⁺ | B⁺ | A⁺ | A⁺ |
|  | A⁻ | A⁻ | B⁻ | B⁻ |

(b)

|  | Pc | | W | |
|---|---|---|---|---|
|  | R | G | | |
| Px { | B⁺ | B⁺ | A⁺ | A⁺ |
|  | A⁻ | A⁻ | B⁻ | B⁻ |
| Px { | A⁻ | A⁻ | B⁻ | B⁻ |
|  | B⁺ | B⁺ | A⁺ | A⁺ |
| B | B⁺ | B⁺ | A⁺ | A⁺ |
|  | A⁻ | A⁻ | B⁻ | B⁻ |
|  | A⁻ | A⁻ | B⁻ | B⁻ |
|  | B⁺ | B⁺ | A⁺ | A⁺ |

(c)

|  | Pc | | W | |
|---|---|---|---|---|
|  | R | G | | |
| Px { | B⁺ | B⁺ | A⁺ | A⁺ |
| Px { | A⁻ | A⁻ | B⁻ | B⁻ |
| B | B⁺ | B⁺ | A⁺ | A⁺ |
|  | A⁻ | A⁻ | B⁻ | B⁻ |

(d)

|  | Pc | | W | |
|---|---|---|---|---|
|  | R | G | | |
| Px { | B⁺ | B⁺ | A⁺ | A⁺ |
| Px { | B⁺ | B⁺ | A⁺ | A⁺ |
| B | A⁻ | A⁻ | B⁻ | B⁻ |
|  | A⁻ | A⁻ | B⁻ | B⁻ |

FIG.9
(a)
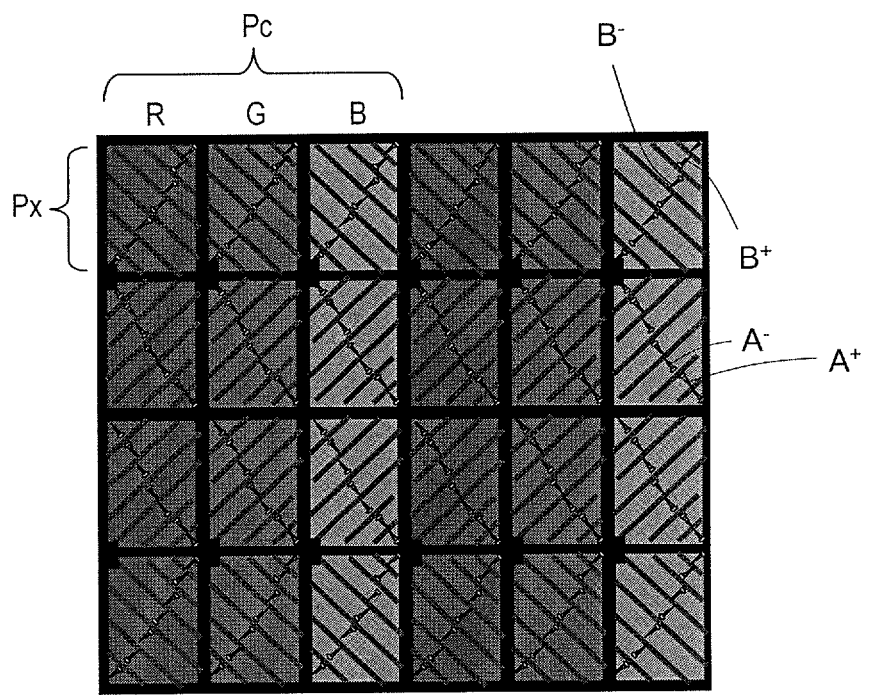
(b)
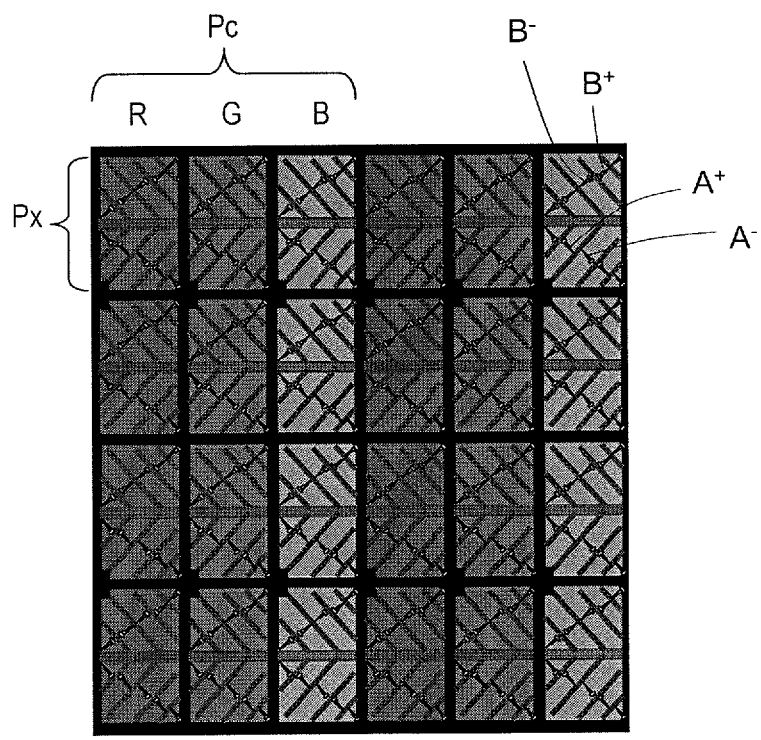

FIG.11
(a)
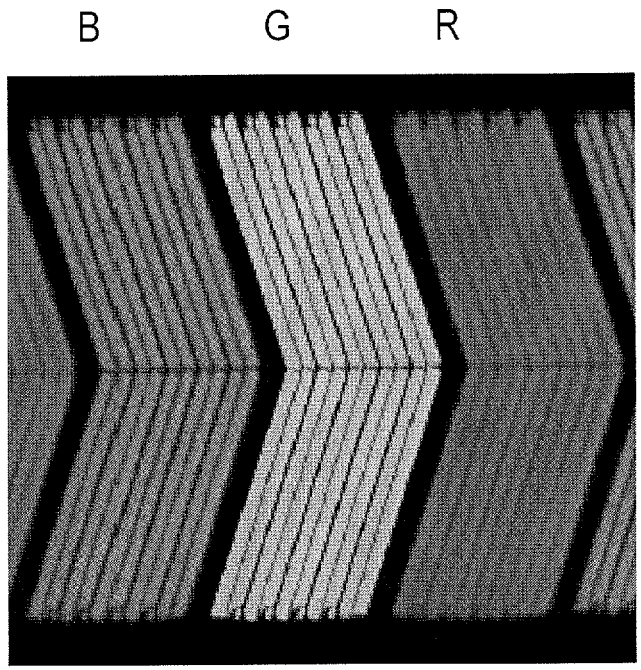
(b)
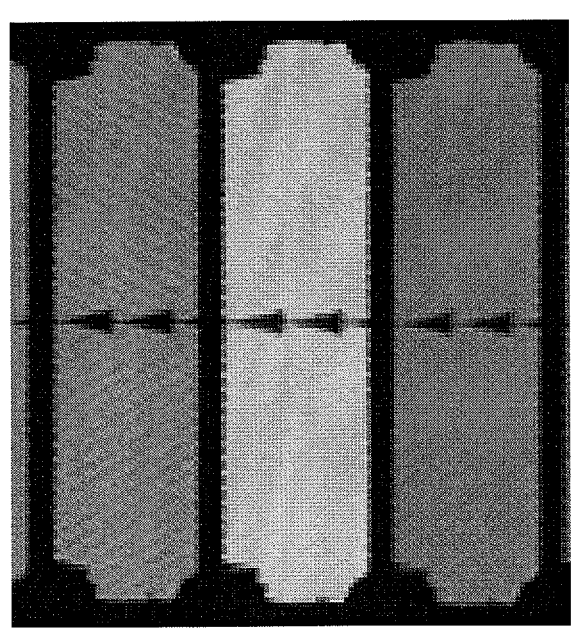

LIQUID CRYSTAL DISPLAY DEVICE

TECHNICAL FIELD

The present invention relates to a liquid crystal display device and more particularly relates to a liquid crystal display device with a wide viewing angle characteristic.

BACKGROUND ART

Currently, liquid crystal display devices with a wide viewing angle characteristic are used extensively in liquid crystal TVs and various other electronic devices. Most of those liquid crystal display devices operate in either the VA mode or the transverse electric field mode.

A VA mode liquid crystal display device includes a liquid crystal layer which is made of a nematic liquid crystal material with negative dielectric anisotropy. When no voltage is applied to that liquid crystal layer (and when a voltage that is lower than a threshold voltage is applied), liquid crystal molecules are aligned substantially perpendicularly (i.e., to define an angle of 85 to 90 degrees) to the surface of the substrate (more exactly, to the surface of the vertical alignment film). But when a voltage is applied to the liquid crystal layer, the liquid crystal molecules fall and get aligned substantially parallel to the surface of the substrate.

An MVA (multi-domain vertical alignment) mode liquid crystal display device, of which the viewing angle characteristic is superior to even that of the VA mode liquid crystal display device, is known (see Patent Document No. 1, for example). In the MVA mode device, by arranging two sets of linear alignment control structures (such as slits or ribs) that run in two mutually orthogonal directions, four liquid crystal domains (which will be simply referred to herein as "domains"), of which the representative director azimuths define an angle of 45 degrees with respect to the polarization axes (or transmission axes) of two polarizers that are arranged as crossed-Nicols, are formed between the alignment control structures. Supposing the three o'clock direction defines an azimuth angle of 0 degrees and the counterclockwise direction is positive if the display screen is compared to the face of a clock, the directors of those four liquid crystal domains define azimuth angles of 45, 135, 225 and 315 degrees, respectively. Such a structure in which four domains are formed in each single pixel is sometimes called a "quadruple alignment structure" or simply "4D structure". Among those MVA mode liquid crystal display devices, ones that use slits that have been cut through electrodes as the alignment control structures to be provided on the surface of two substrates that face each other with a liquid crystal layer interposed between them are sometimes called a PVA (patterned vertical alignment) mode device.

The applicant of the present application developed and mass-produced VATN (vertical alignment twisted nematic) mode liquid crystal display devices.

FIG. 10(a) illustrates the structure of a pixel Px of a VATN mode liquid crystal display device produced by the applicant of the present application. As shown in FIG. 10(a), the pixel Pc has four kinds of domains. The azimuth angle of each of the directors that characterize these four kinds of domains defines an angle of 45 degrees with respect to the polarization axes (i.e., transmission axes) of two polarizers that are arranged as crossed Nicols. The director of each of these domains corresponds to the tilt direction of liquid crystal molecules (which are illustrated as circular cones in FIGS. 10(a) and 10(b)) that are located around the middle of the thickness of the liquid crystal layer. If the two polarization axes are respectively arranged in the vertical and horizontal directions on the display screen and if the display screen is compared to the face of a clock, supposing the three o'clock direction defines an azimuth angle of 0 degrees and the counterclockwise direction is positive, the directors of those four kinds of domains define azimuth angles of 135, 225, 315 and 45 degrees, respectively, as shown in FIG. 10(b). These four kinds of domains will be referred to herein as $A^+$, $B^+$, $A^-$ and $B^-$, respectively (see FIG. 10(c)). A VATN mode liquid crystal display device, of which each pixel has those four kinds of domains, is produced by subjecting its alignment film to an optical alignment treatment as disclosed in Patent Documents Nos. 2 and 3, for example. Such a technique for improving the viewing angle characteristic by forming multiple different kinds of domains, of which the directors define mutually different alignment directions, in a single pixel is often called an "alignment division" technique.

In the liquid crystal display device shown in FIG. 10(a), each pixel Px has two subpixels $SP_1$ and $SP_2$, which exhibit mutually different luminances at least when a certain half-scale tone is displayed. That is to say, when the pixel Px displays a certain half-scale tone (which may be any grayscale level but grayscale level 0 for black display and grayscale level 255 for white display in the case of a 256 grayscale display), one of the two subpixels $SP_1$ and $SP_2$ exhibits a luminance corresponding to a higher grayscale level (>46) than that half scale tone (which may be level 46) and the other subpixel exhibits a luminance corresponding to a lower grayscale level (<46) than the half scale tone. Such a state is realized by applying mutually different voltages to the respective liquid crystal layers of the two subpixels $SP_1$ and $SP_2$ (see Patent Document No. 4, for example). The two subpixels $SP_1$ and $SP_2$ have mutually different γ characteristics (i.e., the grayscale dependences of the display luminance), and the γ characteristic of the pixel Px is represented as the average of the two γ characteristics. That is why the viewing angle dependence of the γ characteristic can be reduced. Such a technique for reducing the viewing angle dependence of the γ characteristic by defining multiple subpixels (such as $SP_1$ and $SP_2$), of which the liquid crystal layers may be supplied with mutually different voltages, in a single pixel Px in this manner is often called a "pixel division" technique. For example, the pixel Px shown in FIG. 10(a) is divided into two subpixels by the pixel division technique and each of those two subpixels $SP_1$ and $SP_2$ is further divided into four domains by the alignment division technique. A lot of specific methods for realizing the pixel division are known and have their own advantages and disadvantages. As for a normally black mode liquid crystal display device such as a VA mode device, it is recommended that the device is configured to widen the luminance difference between the subpixels at low grayscales (see Patent Document No. 4, for example).

In this description, a term "color display pixel" will be used along with the terms "pixel" and "subpixel". The minimum unit of color display in a direct viewing color liquid crystal display device is called a "color display pixel". Such a color display pixel consists of multiple pixels that represent multiple different primary colors. For instance, in the example illustrated in FIG. 10(a), the color display pixel Pc is made up of R, G and B pixels. Recently, in order to broaden the range of colors that can be reproduced by a liquid crystal display device (which is called a "color reproduction range"), techniques for increasing the number of primary colors for use to perform a display operation have been proposed. For example, Patent Document No. 5 discloses a liquid crystal display device that uses a color display pixel including not only red (R), green (G) and blue (B) pixels but also at least one more color pixel (which may be a yellow (Ye) pixel, a cyan (Cy) pixel, a magenta (Mg) pixel or a white pixel). If a white pixel is added, then the color reproduction range cannot be broadened but the display luminance can be increased. Examples of known pixel (or primary color) arrangement patterns include not only the vertical striped arrangement shown in FIG. 10 but also a horizontal striped arrangement, a pentile arrangement, and a delta arrangement. Meanwhile, a liquid crystal display device for use in a display device that conducts a color display operation by field sequential driving and a monochrome display liquid crystal display device do not include any color filters and do not have any color display pixels.

CITATION LIST

Patent Literature

Patent Document No. 1: Japanese Laid-Open Patent Publication No. 11-242225
Patent Document No. 2: Japanese Laid-Open Patent Publication No. 11-352486
Patent Document No. 3: PCT International Application Publication No. 2006/132369
Patent Document No. 4: Japanese Laid-Open Patent Publication No. 2004-62146 (corresponding to U.S. Pat. No. 6,958,791)
Patent Document No. 5: Japanese Laid-Open Patent Publication No. 2008-76416
Patent Document No. 6: PCT International Application Publication No. 2009/075081
Patent Document No. 7: Japanese Laid-Open Patent Publication No. 2002-357830
Patent Document No. 8: Japanese Laid-Open Patent Publication No. 2006-78968

Non-Patent Literature

Non-Patent Document No. 1: K. Hanaoka et al., "A New MVA-LCD by Polymer Sustained Alignment Technology", SID 04 DIGEST 1200-1203 (2004)
Non-Patent Document No. 2: K. H. Kim, et al., "Domain Divided Vertical Alignment Mode with Optimized Fringe Field Effect", Proc. SID 1998 383-386 (1998)
Non-Patent Document No. 3: J. H. Lee et al., "Novel Surface-Stabilized Vertical Alignment Mode for High Transmittance and Fast Response", IMID/IDMC/ASIA DISPLAY 2010 DIGEST 183-184 (2010)
Non-Patent Document No. 4: S. Suwa et al., "Novel Field-induced Pre-tilt Alignment Technique Using a Photo-reactive Alignment Layer for VA LCD", SID 2010 Digest 595-597 (2010)

SUMMARY OF INVENTION

Technical Problem

If the alignment division, pixel division and/or multi-primary-color representation described above is/are adopted in order to improve the display quality of a liquid crystal display device, the effective aperture ratio (i.e., the display luminance) of each pixel decreases.

Hereinafter, it will be described with reference to FIG. 10(a) again how such a problem of decreased luminance is caused by the alignment division in the VATN mode liquid crystal display device.

As described above, the pixel Px shown in FIG. 10(a) is divided into two subpixels by the pixel division technique, and each of the two subpixels is further divided into four domains by the alignment division technique. That is to say, each of the two subpixels $SP_1$ and $SP_2$ is comprised of four kinds of domains and one pixel is made up of eight domains in total.

If such a multi-domain structure (alignment division structure) as this is formed in a VATN mode liquid crystal display device, crossed dark lines will be produced to run through the center of those four kinds of domains, thus causing a decrease in display luminance. In the pixel Px shown in FIG. 10(a), each of the two subpixels $SP_1$ and $SP_2$ is comprised of four kinds of domains, and therefore, there are two crosses in each pixel Px. That is to say, if the pixel division structure (which will be sometimes referred to herein as a "multi-pixel structure") is adopted and if the quadruple alignment structure is adopted for each subpixel, the display luminance decreases. If the number of domains that form one pixel Px (i.e., the number of alignment division) is simply reduced, then naturally the display luminance increases but the viewing angle characteristic deteriorates.

Thus, to overcome such a problem, Patent Document No. 5 discloses a liquid crystal display device in which each pixel is divided into two subpixels, each of which has a double alignment structure, so that each pixel is comprised of four domains. In this case, the four domains that form a single pixel are four kinds of domains $A^+$, $B^+$, $A^-$ and $B^-$. For example, bright subpixels may be defined by the domains $A^+$ and $B^+$ and dark subpixels may be defined by the domains $A^-$ and $B^-$. According to the technique disclosed in Patent Document No. 5, to minimize the decline in viewing angle characteristic due to the decreased number of alignment division of respective subpixels, the liquid crystal display device is driven so that the bright subpixels and the dark subpixels are changed with each other every vertical scanning period and are both comprised of four kinds of domains when considered in two consecutive vertical scanning periods. For example, in one vertical scanning period, the subpixels defined by the domains $A^+$ and $B^+$ are used as bright subpixels and the subpixels defined by the domains $A^-$ and $B^-$ are used as dark subpixels as described above. And in the next vertical scanning period, the subpixels defined by the domains $A^+$ and $B^+$ are used as dark subpixels and the subpixels defined by the domains $A^-$ and $B^-$ are used as bright subpixels in turn.

Even in the liquid crystal display device disclosed in Patent Document No. 5, however, every one of the four kinds of domains is still present in a single pixel, and therefore, a dark line is still produced along the boundary between the domains to cause a decrease in display luminance. In addition, the liquid crystal material should always be driven at twice as high a frequency as the ordinary one. For example, as a for a normal 2× driven liquid crystal display device currently available, the liquid crystal material should be driven at 4× rate. In that case, sometimes the liquid crystal material would fail to respond quickly enough to avoid generating a blurry moving picture. In such a situation, the drivers would generate too much heat and the power dissipation would rise significantly, which is a problem.

It should be noted that "one vertical scanning period" refers herein to a period between a point in time when one gate bus line (or scan line) is selected and a point in time when that gate bus line is selected next time. In a conventional liquid crystal display device that is not driven by 2× driving method, one vertical scanning period corresponds to one frame period of a video signal if the video signal is a non-interlaced drive signal but corresponds to one field period of a video signal if the video signal is an interlaced drive signal. Since the liquid crystal display device is not supposed to be interlaced driven, signal voltages are written on every pixel in both of odd- and even-numbered fields. Thus, in the case of an NTSC signal, for example, one vertical scanning period of the liquid crystal display device is 16.7 msec, which is the inverse number of the field frequency (60 Hz) of the NTSC signal. In the case of 2× drive, one vertical scanning period is 1/120 seconds. On the other hand, in the case of 4× drive, one vertical scanning period becomes 1/240 seconds.

In the foregoing description, the problem with the conventional wide viewing angle mode liquid crystal display device has been pointed out with the VATN mode device taken as an example. However, the same can be said about other VA modes, including MVA, PSA, FPA and SS-VA modes (see Patent Documents Nos. 7 and 8 and Non-Patent Documents Nos. 1 through 4), not just the VATN mode. In the case of an MVA mode device, the dark line is not always produced along the boundary between the domains, but the alignment of liquid crystal molecules is disturbed in the vicinity of the boundary between the domains. Thus, to prevent the disturbed alignment of liquid crystal molecules from debasing the display quality, a portion in the vicinity of the boundary between the domains is sometimes shielded from light. In that case, however, the display luminance decreases. It should be noted that by adopting the VATN mode, the luminance can be 1.2 times as high as in the conventional MVA mode.

Furthermore, not only those VA modes but also transverse electric field modes (such as IPS and FFS modes) have the same problem, too. FIG. 11(a) shows an optical image of a pixel of an IPS mode liquid crystal display device, and FIG. 11(b) shows an optical image of a pixel of an FFS mode liquid crystal display device. As shown in FIGS. 11(a) and 11(b), in the IPS and FFS modes, a single pixel is comprised of two kinds of domains with mutually different director azimuths, and a dark line (i.e., the black line that runs horizontally through the center portion of the pixel) is produced along the boundary between the two domains. As can be seen, even in the transverse electric field liquid crystal display device with the double alignment structure, the dark line is also produced and the display luminance also decreases. The same statement also applies to normally black modes other than the VA and transverse electric field modes, e.g., the blue phase mode.

The entire disclosures of those Patent Documents Nos. 1 through 8 and those Non-Patent Documents Nos. 1 through 4 are hereby incorporated by reference.

The present inventors perfected our invention in order to overcome such problems and an object of the present invention is provide a liquid crystal display device that can reduce such deterioration in viewing angle characteristic and can increase the display luminance significantly compared to a VA mode liquid crystal display device with the quadruple alignment structure and a transverse electric field mode liquid crystal display device with the double alignment structure.

Solution to Problem

A liquid crystal display device as an embodiment of the present invention has a display area that includes a plurality of pixels. The display area is made up of n kinds of domains (where n is an integer that is equal to or greater than two and equal to or smaller than four). The directors of the n kinds of domains define mutually different alignment directions. If the domain structure of each pixel is defined by the kinds of the domains that form the pixel, the number k of the kinds of the domains that form the pixel, and the arrangement of the domains in the pixel, the display area includes a pixel, of which k is less than n and of which the domain structure is different from the domain structures of adjacent pixels.

In one embodiment, the plurality of pixels are arranged in rows and columns to form a matrix pattern, and the device includes a group of pixels in which the number of the kinds of the domains that form mutually adjacent pixels that are arranged in two rows and two columns is n.

In one embodiment, the plurality of pixels are arranged in rows and columns to form a matrix pattern, and the device includes a group of pixels in which the number of the kinds of the domains that form two mutually adjacent pixels is n.

In one embodiment, the liquid crystal display device has a display area that includes a plurality of color display pixels. Each color display pixel includes two or more pixels that represent mutually different primary colors. The display area is made up of n kinds of domains (where n is an integer that is equal to or greater than two and equal to or smaller than four). The directors of the n kinds of domains define mutually different alignment directions. If the domain structure of each color display pixel is defined by the kinds of the domains that form the color display pixel, the number m of the kinds of the domains that form the color display pixel, and the arrangement of the domains in the color display pixel, and if the domain structure of each pixel is defined by the kinds of the domains that form the pixel, the number k of the kinds of the domains that form the pixel, and the arrangement of the domains in the pixel, the plurality of color display pixels include a color display pixel, of which k is less than n and of which the domain structure is different from the domain structures of adjacent color display pixels.

In one embodiment, each of the plurality of color display pixels includes four or more pixels that represent mutually different primary colors.

In one embodiment, the plurality of color display pixels are arranged in rows and columns to form a matrix pattern, and the device includes a group of color display pixels in which the number of the kinds of the domains that form mutually adjacent color display pixels that are arranged in two rows and two columns is n.

In one embodiment, the plurality of color display pixels are arranged in rows and columns to form a matrix pattern, and the device includes a group of color display pixels in which the number of the kinds of the domains that form two mutually adjacent color display pixels is n.

In one embodiment, the number of the kinds of the domains that form each of the plurality of color display pixels is n.

In one embodiment, the liquid crystal display device operates in one of VATN, MVA, PSA, FPA, SS-VA, IPS, FFS and blue phase modes.

In one embodiment, the liquid crystal display device is a VATN mode liquid crystal display device. The number n of the kinds of the domains that form each of the plurality of color display pixels is four. Each of the plurality of color display pixels includes R, G, B and Ye pixels. And the B pixel includes four kinds of domains, the R and G pixels each include two kinds of domains, and the Ye pixel includes two kinds of domains which are different from the two kinds of domains that the R and G pixels have.

In one embodiment, the liquid crystal display device is a VATN mode liquid crystal display device, n is four, and if the arrangement of the four kinds of domains that are arranged in two rows and two columns is represented by first, second, third and fourth quadrants to be defined by supposing horizontal and vertical directions on a display screen to be X- and Y-axes, respectively, the director azimuths of the domains to be arranged in the first, second, third and fourth quadrants are one of the following four combinations:

a) 135, 225, 315 and 45 degrees;
b) 315, 45, 135 and 225 degrees;
c) 225, 135, 45 and 315 degrees; and
d) 45, 315, 225, and 135 degrees.

In one embodiment, the liquid crystal display device is a PSA mode liquid crystal display device, n is four, and if the arrangement of the four kinds of domains that are arranged in two rows and two columns is represented by first, second, third and fourth quadrants to be defined by supposing horizontal and vertical directions on a display screen to be X- and Y-axes, respectively, the director azimuths of the domains to be arranged in the first, second, third and fourth quadrants are 45, 135, 225, and 315 degrees, respectively.

In one embodiment, each group of pixels that represent the respective primary colors includes n kinds of domains, of which the areas are substantially equal to each other.

In one embodiment, each of the plurality of pixels is comprised of two or more subpixels that exhibit mutually different luminances at least when displaying a certain half scale tone. Each of the two or more subpixels is comprised of at least one domain. And if the domain structure of each subpixel is defined by the kinds of the domains that form the subpixel, the number j of the kinds of the domains that form the subpixel, and the type of the arrangement of the domains in the subpixel, the plurality of pixels include a pixel, of which j is equal to or smaller than k and of which the domain structure is different from the domain structures of adjacent pixels.

In one embodiment, a set of subpixels that have the highest luminance in the two or more subpixels has n kinds of domains, of which the areas are substantially equal to each other.

In one embodiment, a set of subpixels that have the lowest luminance in the two or more subpixels has n kinds of domains, of which the areas are substantially equal to each other.

In one embodiment, the areas of the n kinds of domains that form the display area are substantially equal to each other.

Advantageous Effects of Invention

The present invention provides a liquid crystal display device that can reduce a deterioration in viewing angle characteristic and can increase the display luminance significantly compared to a VA mode liquid crystal display device with the quadruple alignment structure and a transverse electric field mode liquid crystal display device with the double alignment structure. Among other things, the liquid crystal display device of the present invention can be used particularly effectively as a 3D display device, because not so much the viewing angle characteristic as high-luminance display is important for a 3D display device.

BRIEF DESCRIPTION OF DRAWINGS

FIG. 1 (a) through (d) show the results of simulations on the distribution of transmittances of pixels, wherein (a) shows a situation where the number of alignment division (i.e., the number of domains) is one, (b) and (c) show a situation where the number of alignment division is two, and (d) shows a situation where the number of alignment division is four.

FIG. 2 (a) through (f) illustrate exemplary arrangements of four kinds of domains in a liquid crystal display device as an embodiment of the present invention.

FIG. 3 (a) through (d) illustrate other exemplary arrangements of four kinds of domains in a liquid crystal display device as an embodiment of the present invention.

FIG. 4 (a) through (f) illustrate exemplary arrangements of four kinds of domains in a liquid crystal display device (with a pixel division structure) as an embodiment of the present invention.

FIGS. 5 (a) and (b) illustrate other exemplary arrangements of four kinds of domains in a liquid crystal display device (with a pixel division structure) as an embodiment of the present invention.

FIG. 6 (a) through (d) illustrate exemplary arrangements of four kinds of domains in a liquid crystal display device (with four-primary-color color display pixels) as an embodiment of the present invention.

FIG. 8 (a) through (d) illustrate other exemplary arrangements of four kinds of domains in a liquid crystal display device (with four-primary-color color display pixels) as an embodiment of the present invention.

FIG. 9 (a) illustrates an exemplary arrangement of four kinds of domains for MVA, FPA and SS-VA mode liquid crystal display devices as embodiments of the present invention, and (b) illustrates an exemplary arrangement of four kinds of domains in conventional liquid crystal display devices of the same modes.

FIG. 11 (a) shows an optical image of pixels of an IPS mode liquid crystal display device and (b) shows an optical image of pixels of an FFS mode liquid crystal display device.

DESCRIPTION OF EMBODIMENTS

Hereinafter, a liquid crystal display device as an embodiment of the present invention will be described with reference to the accompanying drawings. Although a VATN mode liquid crystal display device will be described as just an example of the present invention in the following description, the present invention is also applicable to any VA mode (such as MVA mode or PSA mode) liquid crystal display device other than the VATN mode, a transverse electric field mode (such as IPS mode or FFS mode) liquid crystal display device, or a normally black mode liquid crystal display device such as a blue phase mode as well.

Figure 10:
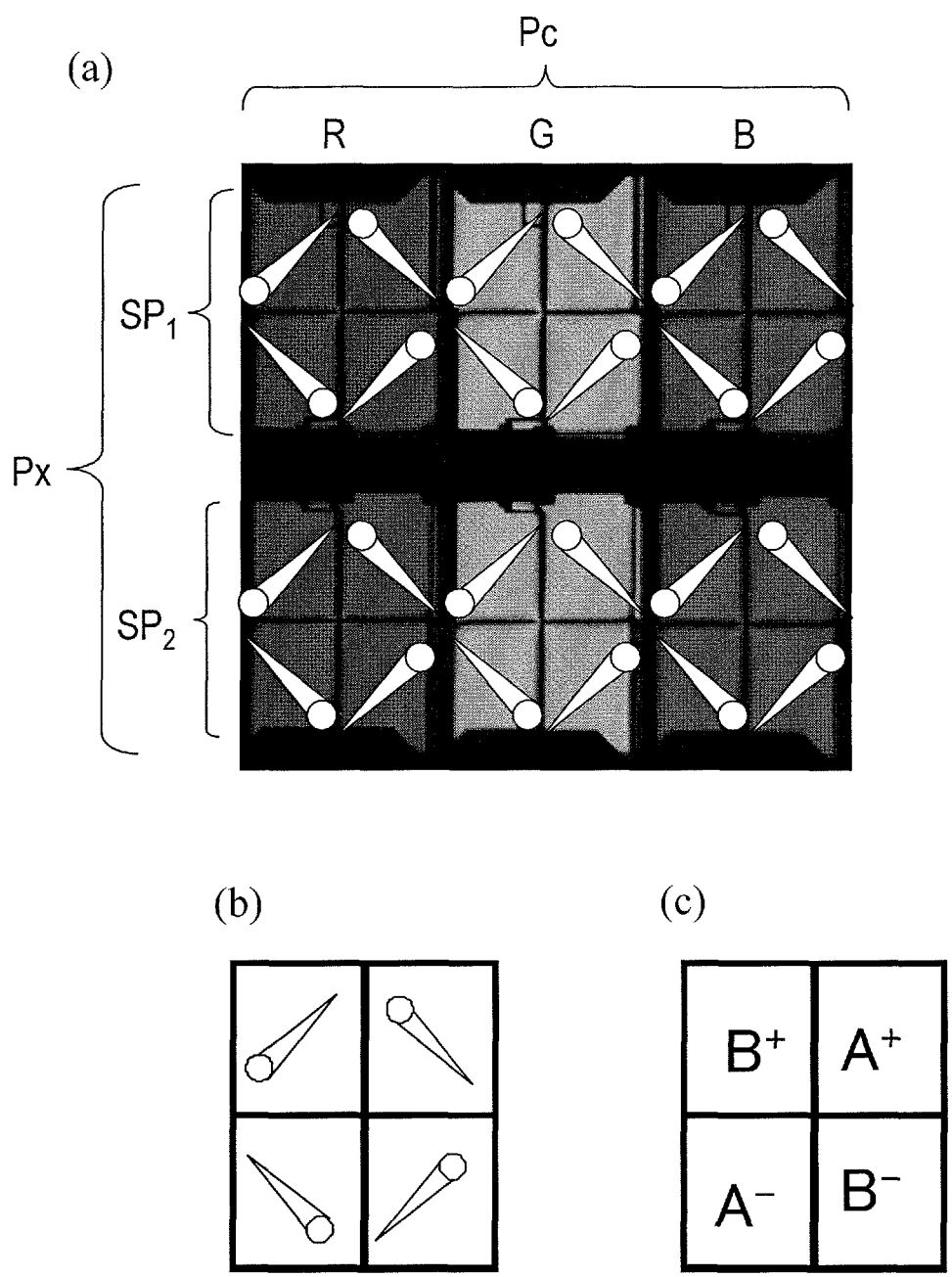
FIG. 10 (a) illustrates the structure of pixels Px in a known VATN mode liquid crystal display device, (b) illustrates the arrangement of directors in four kinds of domains, and (c) illustrates the signs representing those four kinds of domains.

First of all, the relation between the transmittance of a pixel of a VATN mode liquid crystal display device and the number of alignment division (i.e., the number of domains) will be described with reference to FIG. 1. FIGS. 1(a) through 1(d) show the results of simulations on the distribution of transmittance in a pixel. Specifically, FIG. 1(a) illustrates a situation where the number of alignment division (the number of domains) was one, FIGS. 1(*b*) and 1(*c*) illustrate situations where the number of alignment division was two, and FIG. 1(*d*) illustrates a situation where the number of alignment division was four. Each pixel had a size of 170 μm (width)×260 μm (length). The pretilt angle defined by the vertical alignment films on the upper and lower substrates was 88.6 degrees. The liquid crystal layer had a thickness (cell thickness) of 3.4 μm. And the device operated in a VATN mode in which a nematic liquid crystal material with a birefringence of 0.1 and a dielectric anisotropy Δε of −3.0 had a 90 degree twisted alignment state. Each of FIGS. 1(*a*) through 1(*d*) shows the distribution of transmittance in white display state when a voltage of 7.5 V was applied to the liquid crystal layer. Also, the signs shown in FIGS. 1(*a*) through 1(*d*) indicate the respective kinds of the domains just like the signs shown in FIG. 10(*c*).

As a result of the simulations, if the transmittance of the four-domain pixel shown in FIG. 1(*d*) was 100, the transmittance of the one-domain pixel shown in FIG. 1(*a*) was 108, the transmittance of the two-domain (vertical) pixel shown in FIG. 1(*b*) was 106, and the transmittance of the two-domain (horizontal) pixel shown in FIG. 1(*c*) was 103. That is to say, the larger the number of alignment division, the lower the transmittance. Also, as can be seen by comparing FIGS. 1(*b*) and 1(*c*) to each other, the boundary between the domains produced in the pixel would be a dark line to decrease the transmittance, and therefore, the two-domain (vertical) pixel with the shorter boundary line shown in FIG. 1(*c*) had the higher transmittance than the other. As can be seen, by reducing the number of alignment division, the transmittance can be increased.

A liquid crystal display device according to an embodiment of the present invention has a display area that includes a plurality of pixels. The display area is made up of n kinds of domains (where n=4 in the VA mode), the directors of which define mutually different alignment directions. If the domain structure of each pixel is defined by the kinds of the domains that form the pixel, the number k of the kinds of the domains that form the pixel, and the arrangement of the domains in the pixel, the display area is configured to include a pixel, of which k is less than n and of which the domain structure is different from those of adjacent pixels. That is to say, by setting the number k of the kinds of the domains that form each pixel to be less than n (i.e., less than four in this example), the transmittance can be increased. Meanwhile, look at the entire display area including a plurality of pixels, and it can be seen that the display area is configured to have n kinds (i.e., four kinds in this example) of domains and to include a pixel, of which the domain structure is different from those of adjacent pixels. That is why the deterioration in viewing angle characteristic due to the decrease in the number of alignment division can be minimized. It should be noted that a liquid crystal display device with a double alignment structure such as a transverse electric field mode device satisfies n=2.

To minimize the deterioration in viewing angle characteristic, if a plurality of pixels that form the display area are arranged in rows and columns to form a matrix pattern, the device suitably includes a group of pixels in which the number of the kinds of the domains that form mutually adjacent pixels that are arranged in two rows and two columns is n. More suitably, the device includes a group of pixels in which the number of the kinds of the domains that form two pixels that are adjacent to each other in either the row direction or the column direction is n. Naturally, it is ideal that the entire display area consists of such groups of pixels. However, at the corners of the display area (e.g., on the uppermost row, the lowermost row, the rightmost column and/or the leftmost column), there are too small a number of adjacent pixels to form such groups of pixels. Even so, the display quality will be affected only a little and just to a negligible degree.

If the display device is a color display device (i.e., if the display device has a display area with a plurality of color display pixels and if the color display pixels include two or more pixels that represent mutually different primary colors), the display area of a liquid crystal display device as an embodiment of the present invention is made up of n kinds of domains (where n is an integer that is equal to or greater than two and equal to or smaller than four). The directors of the n kinds of domains define mutually different alignment directions. If the domain structure of each color display pixel is defined by the kinds of the domains that form the color display pixel, the number m of the kinds of the domains that form the color display pixel, and the arrangement of the domains in the color display pixel, and if the domain structure of each pixel is defined by the kinds of the domains that form the pixel, the number k of the kinds of the domains that form the pixel, and the arrangement of the domains in the pixel, the plurality of color display pixels are configured to include a color display pixel, of which k is less than n and of which the domain structure is different from those of adjacent color display pixels. Just as described above, by setting the number k of the kinds of the domains that form each pixel to be less than n (i.e., less than four in this example), the transmittance can be increased. Meanwhile, look at the entire display area, and it can be seen that the display area is configured to have n kinds (i.e., four kinds in this example) of domains and to include a color display pixel, of which the domain structure is different from those of adjacent color display pixels. That is why the deterioration in viewing angle characteristic due to the decrease in the number of alignment division can be minimized. It should be noted that a liquid crystal display device with a double alignment structure such as a transverse electric field mode device satisfies n=2.

To minimize the deterioration in viewing angle characteristic, if a plurality of pixels that form the display area are arranged in rows and columns to form a matrix pattern, the device suitably includes a group of color display pixels in which the number of the kinds of the domains that form mutually adjacent color display pixels that are arranged in two rows and two columns is n. More suitably, the device includes a group of color display pixels in which the number of the kinds of the domains that form two color display pixels that are adjacent to each other is n. And most suitably, the number of the kinds of the domains that form each of those color display pixels is n. Naturally, it is ideal that the entire display area consists of such groups of color display pixels. However, at the corners of the display area (e.g., on the uppermost row, the lowermost row, the rightmost column and/or the leftmost column), there are too small a number of adjacent color display pixels to form such groups of color display pixels. Even so, the display quality will be affected only a little and just to a negligible degree.

However, as tradeoff is inevitable between the viewing angle characteristic and the transmittance (luminance), it may be appropriately determined with the intended application of the liquid crystal display device taken into consideration which of these configurations should be adopted. Also, even though the number of alignment division cannot be less than one, if the same kind of domains are arranged in multiple adjacent pixels, then the area to be subjected to the same alignment treatment can be broadened, and therefore, the alignment treatment can get done more easily. As disclosed in Patent Documents Nos. 2 and 3, for example, if the alignment film is subjected to an optical alignment treatment, the respective openings of the photomask can have an increased size.

Optionally, a liquid crystal display device as an embodiment of the present invention may also have a pixel division structure. Specifically, in that case, each of a plurality of pixels that the liquid crystal display device according to such an embodiment has is comprised of two or more subpixels that exhibit mutually different luminances at least when displaying a certain half scale tone. Each of the two or more subpixels is defined by at least one domain. If the domain structure of each subpixel is defined by the kinds of the domains that form the subpixel, the number j of the kinds of the domains that form the subpixel, and the type of the arrangement of the domains in the subpixel, the plurality of pixels include a pixel, of which j is equal to or smaller than k and of which the domain structure is different from those of adjacent pixels. For example, supposing n=4, even if k and j are both one, the deterioration in viewing angle characteristic can still be minimized by setting the number of the kinds of the domains that form any arbitrary adjacent pixels or color display pixels that are arranged in two rows and two columns to be n.

Naturally, in any of these cases, to realize as uniform viewing angle characteristic as possible, the respective areas of the n kinds of domains that form the display area are suitably substantially equal to each other. In a color display device, on the other hand, each set of pixels representing the respective primary colors suitably includes the n kinds of domains, and the respective areas of the n kinds of domains included in the set of pixels representing the respective primary colors are suitably substantially equal to each other. Also, if the device has the pixel division structure, a set of subpixels that have the highest luminance in the two or more subpixels suitably has n kinds of domains, of which the areas are suitably substantially equal to each other. On the other hand, a set of subpixels that have the lowest luminance in the two or more subpixels more suitably has n kinds of domains, of which the areas are substantially equal to each other. The relation in luminance level between two or more subpixels can be changed according to the driving method. That is why the relation described above may be satisfied through a plurality of vertical scanning periods. However, it is recommended that the relation described above be satisfied in an arbitrary vertical scanning period.

Hereinafter, a liquid crystal display device as an embodiment of the present invention will be described in further detail by taking, as just an example, a particularly suitable one of a lot of examples that satisfy the requirements described above. The liquid crystal display device to be described below as a specific example operates in the VATN mode and satisfies n=4 as described above.

In the liquid crystal display devices shown in FIG. 2(a) through 2(f), three pixels Px (namely, one red (R) pixel, one green (G) pixel and one blue (B) pixel) form a single color display pixel Pc. In each of these drawings, shown are a grand total of eight color display pixels Pc which are arranged in four rows and two columns. This arrangement is actually repeated in both of the row and column directions.

Specifically, in the liquid crystal display device shown in FIG. 2(a), each pixel Px is split into two horizontally, and is comprised of two kinds of domains (i.e., k=2). Also, a single color display pixel Pc is made up of two kinds of domains (i.e., m=2).

Now take a look at the pixel Px at the upper left corner (i.e., the R pixel). This pixel (R pixel) Px is comprised of domains $B^+$ and $A^+$, the number k of the kinds of domains is two, and those two domains are arranged horizontally. Also, the respective areas of these domains $B^+$ and $A^+$ are equal to each other. Each of the other pixels belonging to the same row has the same domain structure.

Next, look at the pixel Px that is adjacent in the column direction to the pixel Px at the upper left corner (i.e., the R pixel). This pixel (i.e., the pixel on the second row as counted from the top in FIG. 2(a)) is comprised of domains $A^-$ and $B^-$, the number k of the kinds of domains is two, and those two domains are arranged horizontally. Also, the respective areas of these domains $A^-$ and $B^-$ are equal to each other. Each of the other pixels belonging to the same row as this pixel's has the same domain structure. Each of the pixels on the next row down has the same structure as the pixel Px at the upper left corner (the R pixel). That is to say, the pixels Px that form odd-numbered rows shown in FIG. 2(a) have the same domain structure, and the pixels Px that form even-numbered rows also have the same domain structure.

Also, each pixel Px on an odd-numbered row is comprised of two kinds of domains $B^+$ and $A^+$, and each pixel Px on an even-numbered row is comprised of two kinds of domains $A^-$ and $B^-$. That is why any two pixels that are adjacent to each other in the column direction are made up of domains $B^+$ and $A^+$ and domains $A^-$ and $B^-$, and include four kinds of domains (i.e., n=4) in total.

The alignment treatment to make the liquid crystal display device shown in FIG. 2(a) needs to be carried out on a half pixel basis in the row direction and on a pixel basis in the column direction. As for a conventional quadruple pixel, the alignment treatment needs to be carried out on a half pixel basis in both the row direction and the column direction. Thus, since the number of division becomes two (i.e., the number of division in the column direction is one), the alignment treatment should be carried out on a larger unit.

The domain arrangements (where k=2 and m=2) on the first and second rows of the liquid crystal display device shown in FIG. 2(b) are the same as those on the first and second rows of the liquid crystal display device shown in FIG. 2(a). But the third and fourth rows of the liquid crystal display device shown in FIG. 2(b) are obtained by changing the third and fourth rows of the liquid crystal display device shown in FIG. 2(a) with each other. Thus, in the liquid crystal display device shown in FIG. 2(b), the second and third rows have the same domain structure. That is why everywhere in the display area but the uppermost and/or lowermost row(s), any arbitrary pixel and a pixel adjacent to that pixel in the column direction form a group of pixels consisting of four kinds of domains (i.e., n=4).

Also, everywhere in the display area but the uppermost and/or lowermost row(s), the alignment treatment needs to be carried out on a half pixel basis in the row direction and on a two pixel basis in the column direction. Thus, in the liquid crystal display device shown in FIG. 2(b), the alignment treatment can be carried out in the column direction on a larger unit than (i.e., on twice as large a unit as) the liquid crystal display device shown in FIG. 2(a), which is beneficial. However, if the pixels on the uppermost and/or lowermost row(s) of the display area have a different domain structure from the pixels on the adjacent row as shown in FIG. 2(b), the alignment treatment needs to be carried out on a half pixel basis in the row direction and on a pixel basis in the column direction as for the uppermost and/or lowermost row(s). On the other hand, if the pixels on the uppermost and/or lowermost row(s) have the same domain structure as the pixels on the adjacent row, the pixels on none of those rows can form a group of pixels including four kinds of domains (i.e., n=4) with the pixels adjacent to them in the column direction. Nevertheless, this configuration may be adopted because the display quality is affected a little by the uppermost and/or lowermost row(s).

Figure 2:
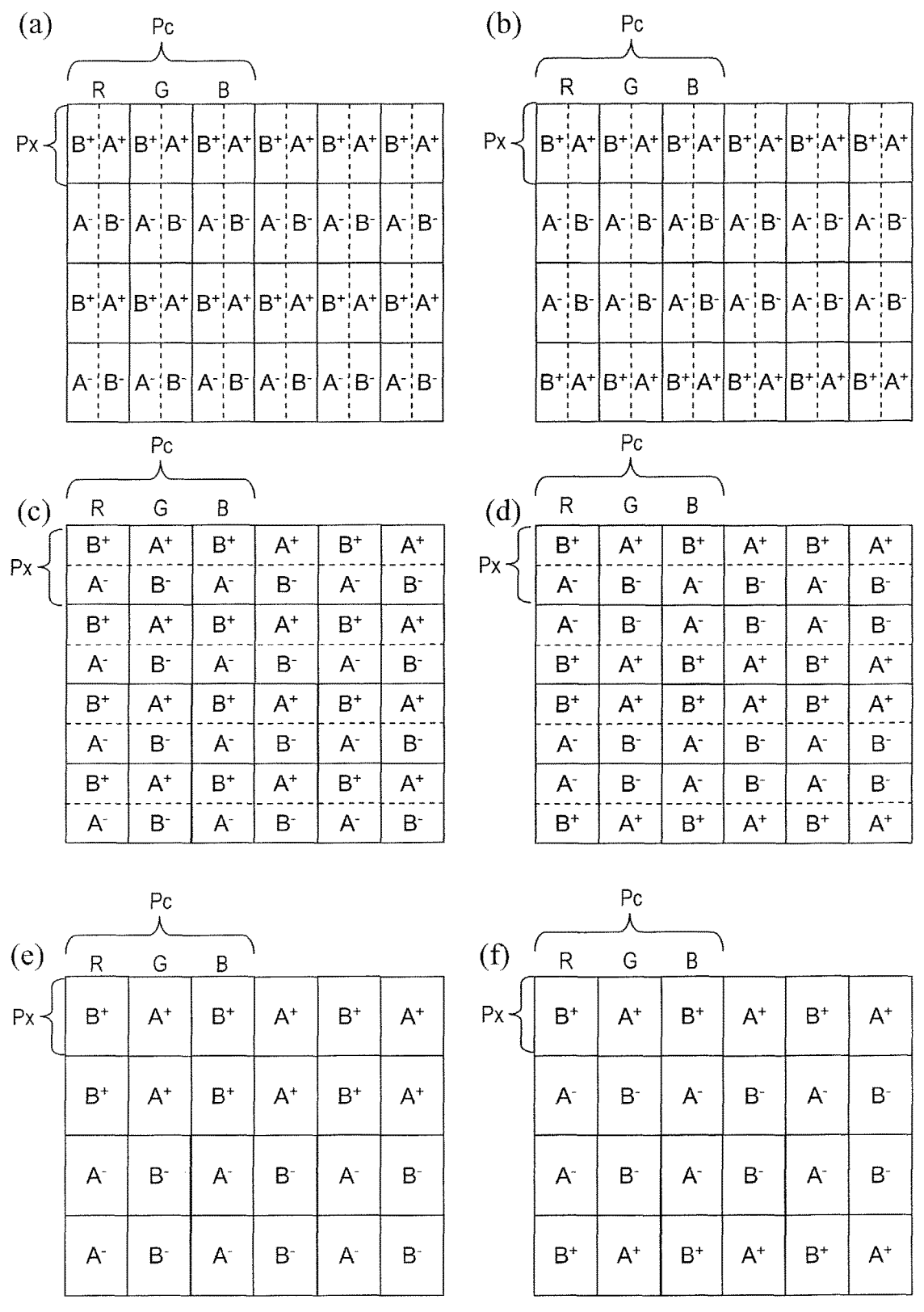

In the liquid crystal display devices shown in FIGS. 2(*a*) and 2(*b*), the color display pixels Pc belonging to the same row have the same domain structure. However, color display pixels Pc that are adjacent to each other in the row direction may have mutually different domain structures as shown in FIGS. 2(*c*) through 2(*f*).

According to the domain arrangement of the liquid crystal display device shown in FIG. 2(*c*) (where k=2 and m=4), each pixel Px is vertically split into two and is comprised of two kinds of domains.

Now take a look at the pixel Px at the upper left corner (i.e., the R pixel). This pixel (R pixel) Px is comprised of domains $B^+$ and $A^-$, the number k of the kinds of domains is two, and those two domains are arranged vertically. Also, the respective areas of these domains $B^+$ and $A^-$ are equal to each other. Each of the other pixels belonging to the same column has the same domain structure.

Next, look at the pixel Px (G pixel) that is adjacent in the row direction to the pixel Px (the R pixel) at the upper left corner. This pixel (i.e., the pixel on the second row as counted from the left in FIG. 2(*c*)) is comprised of domains $A^+$ and $B^-$, the number k of the kinds of domains is two, and those two domains are arranged vertically. Also, the respective areas of these domains $A^+$ and $B^-$ are equal to each other. Each of the other pixels belonging to the same column as this pixel's has the same domain structure. Each of the pixels on the next column right (i.e., the G pixel on the third row as counted from the left in FIG. 2(*c*)) has the same structure as the pixel Px at the upper left corner (the R pixel). That is to say, the pixels Px that form odd-numbered columns shown in FIG. 2(*c*) have the same domain structure, and the pixels Px that form even-numbered columns also have the same domain structure.

Also, each pixel Px on an odd-numbered column is comprised of two kinds of domains $B^+$ and $A^-$, and each pixel Px on an even-numbered row is comprised of two kinds of domains $A^+$ and $B^-$. That is why any two pixels that are adjacent to each other in the row direction are made up of domains $B^+$ and $A^-$ and domains $A^+$ and $B^-$, and include four kinds of domains (i.e., n=4) in total. The alignment treatment to make the liquid crystal display device shown in FIG. 2(*c*) needs to be carried out on a pixel basis in the row direction and on a half pixel basis in the column direction.

Next, look at the pixels representing the same color in two color display pixels that are adjacent to each other in the row direction. For example, compare the domain structure of the pixel (R pixel) Px at the upper left corner shown in FIG. 2(*c*) to that of the pixel (R pixel) located on the same row and on the fourth column. The pixel (R pixel) Px at the upper left corner is comprised of domains $B^+$ and $A^-$, while the pixel (R pixel) on the same row and on the fourth column is comprised of domains $A^+$ and $B^-$. That is to say, these two closest pixels Px belonging to the same row and representing the same color include four kinds of domains. Likewise, any other pair of closest pixels Px belonging to the same row and representing the same color also includes four kinds of domains. As can be seen, the liquid crystal display device shown in FIG. 2(*c*) satisfies the condition that in any two color display pixels that are adjacent to each other in the row direction, the four kinds of domains that are included in each group of pixels representing one of the primary colors have the same area.

The domain structure of each pixel on the first row of the liquid crystal display device shown in FIG. 2(*d*) (where k=2 and m=4) is quite the same as that of an associated pixel on the first row of the liquid crystal display device shown in FIG. 2(*c*). However, the domain structure of each pixel on the second row of the liquid crystal display device shown in FIG. 2(*d*) is different from that of an associated pixel on the second row of the liquid crystal display device shown in FIG. 2(*c*). Specifically, the vertical arrangement of the two kinds of domains $B^+$ and $A^-$ that each pixel on the second row has in the liquid crystal display device shown in FIG. 2(*d*) is the inverse of the vertical arrangement of the two kinds of domains $B^+$ and $A^-$ that each pixel on the second row has in the liquid crystal display device shown in FIG. 2(*c*). As a result, the alignment treatment to make the liquid crystal display device shown in FIG. 2(*d*) needs to be carried out on a pixel basis in both the row direction and the column direction. As for the uppermost and/or lowermost row(s), however, the alignment treatment needs to be carried out on a pixel basis in the row direction and on a half pixel basis in the column direction as already described for the liquid crystal display device shown in FIG. 2(*b*).

According to the domain arrangement of the liquid crystal display device shown in FIG. 2(*e*) (where k=1 and m=2), the number of division of each pixel Px is one (i.e., no pixels are divided) and each pixel consists of a single kind of domain.

The pixel (R pixel) Px at the upper left corner consists of domain $B^+$ and the number k of the kinds of domains is one. The pixel (G pixel) Px adjacent in the row direction to the pixel (R pixel) Px at the upper left corner, i.e., the pixel on the second row as counted from the left in FIG. 2(*e*), consists of domain $A^+$ and the number k of the kinds of domains is one. And the pixel (G pixel) Px located more one column on the right, i.e., the pixel on the third row as counted from the left in FIG. 2(*e*), has the same structure as the pixel (R pixel) Px at the upper left corner. In FIG. 2(*e*), pixels on the odd-numbered columns have the same domain structure, and pixels on the even-numbered columns have the same domain structure, too.

In FIG. 2(*e*), each color display pixel on the first row and an associated color display pixel on the second row have the same domain structure. The leftmost color display pixel Pc on the third row is comprised of a pixel (R pixel) Px consisting of domain $A^-$, a pixel (G pixel) Px consisting of domain $B^-$, and a pixel (R pixel) Px consisting of domain $A^-$. Each color display pixel on the third row and an associated color display pixel on the fourth row have the same domain structure. In FIG. 2(*e*), four pixels located at a row 2, column 1 position, a row 2, column 2 position, a row 3, column 1 position and a row 3, column 2 position (i.e., four adjacent pixels arranged in two rows and two columns) form a group of pixels comprised of four kinds of domains $B^+$, $A^+$, $A^-$ and $B^-$. This group of pixels satisfies the condition that four kinds of domains included in a set of pixels representing respective primary colors have substantially equal areas.

To obtain the liquid crystal display device shown in FIG. 2(*e*), the alignment treatment needs to be performed on a pixel basis in the row direction and on a two pixel basis in the column direction. These units of the alignment treatment are twice as large in both the row and column directions as the units of the alignment treatment that needs to be performed to obtain the liquid crystal display device shown in FIG. 2(*a*) and four times as large in the column direction, and as large in the row direction, as the units of the alignment treatment that needs to be performed to obtain the liquid crystal display device shown in FIG. 2(c).

The domain structure of each color display pixel Pc on the first row of the liquid crystal display device shown in FIG. 2(f) (where k=1 and m=2) is the same as that of an associated color display pixel on the first row of the liquid crystal display device shown in FIG. 2(e). However, the domain structure of each color display pixel Pc on the second row of the liquid crystal display device shown in FIG. 2(f) is the same as that of an associated color display pixel Pc on the third row of the liquid crystal display device shown in FIG. 2(e). In FIG. 2(f), four pixels located at a row 1, column 2 position, a row 1, column 2 position, a row 2, column 1 position and a row 2, column 2 position (i.e., four adjacent pixels arranged in two rows and two columns) form a group of pixels comprised of four kinds of domains $B^+$, $A^+$, $A^-$ and $B^-$. This group of pixels satisfies the condition that four kinds of domains included in a set of pixels representing respective primary colors have substantially equal areas.

The alignment treatment to make the liquid crystal display device shown in FIG. 2(f) needs to be carried out on a pixel basis in the row direction and on a two pixel basis in the column direction, respectively. These units of the alignment treatment are twice as large in the row direction, and as large in the column direction, as the units of the alignment treatment that needs to be performed to obtain the liquid crystal display device shown in FIG. 2(b). As for the uppermost and/or lowermost row(s), however, the alignment treatment needs to be carried out on a pixel basis in both the row and column directions as already described for the liquid crystal display device shown in FIG. 2(b).

The size of such a unit of the alignment treatment can be changed into any of various other ones. Hereinafter, examples in which the size of the unit of the alignment treatment is changed with respect to the domain arrangement shown in FIG. 2(c) will be described with reference to FIGS. 3(a) through 3(d).

FIG. 3(a) illustrates a portion of the pixel arrangement shown in FIG. 2(c) which covers four color display pixels Pc that are arranged in two rows and two columns. To make the liquid crystal display device shown in FIG. 3(a), the alignment treatment needs to be performed on a pixel basis in the row direction and on a half pixel basis in the column direction, respectively. However, if each G pixel is split into two in the row direction so that one domain on the left-hand side is of the same kind as the domain of the R pixel and the other domain on the right-hand side is of the same kind as the domain of the B pixel as shown in FIG. 3(b), the unit of the alignment treatment can be 1.5 pixels (i.e., three times as large as the unit of alignment treatment on the conventional quadruple arrangement) in the row direction.

In FIG. 3(c), the unit of the alignment treatment is three times as large in the row direction as the one shown in FIG. 3(a) (i.e., six times as large as the conventional one), and two color display pixels Pc that are adjacent to each other in the row direction include four kinds of domains $B^+$, $A^-$, $A^+$ and $B^-$. On the other hand, in FIG. 3(d), the unit of the alignment treatment is three times as large in the row direction, and twice as large in the column direction, as the one shown in FIG. 3(a) (i.e., six times as large in the row direction as the conventional one), and four color display pixels Pc that are adjacent to each other in the row and column directions include four kinds of domains $B^+$, $A^-$, $A^+$ and $B^-$. In this manner, the size of the unit of the alignment treatment can be increased. However, the larger the size of the unit of the alignment treatment, the lower the degree of uniformity of the viewing angle characteristic tends to be. That is why it is recommended that four color display pixels that are arranged in two rows and two columns include four kinds of domains.

Next, examples of a liquid crystal display device with a pixel division structure will be described with reference to FIGS. 4(a) through 4(f), each of which illustrates an exemplary arrangement of four kinds of domains in a liquid crystal display device (with a pixel division structure) as an embodiment of the present invention. Each of the pixels Px that the liquid crystal display devices shown in FIGS. 4(a) through 4(f) has is comprised of two subpixels $SP_1$ and $SP_2$ that exhibit mutually different luminances at least when displaying a certain half scale tone. In general, the number of subpixels may be three or more. However, the larger the number of pixel division, the greater the area between the subpixels that does not contribute to the display operation. For that reason, to maintain an appropriate display luminance, the number of subpixels is suitably three or less, and more suitably two or less. In the following description, a situation where each pixel is comprised of only two subpixels $SP_1$ and $SP_2$ will be described as an example.

In the conventional liquid crystal display device, each of the subpixels $SP_1$ and $SP_2$ has a quadruple structure (i.e., n=4) as shown in FIG. 10(a). In the liquid crystal display device according to this embodiment of the present invention, on the other hand, if the domain structure of each subpixel is defined by the kinds of the domains that form the subpixel, the number j of the kinds of the domains that form the subpixel, and the type of the arrangement of the domains in the subpixel, the plurality of pixels include a pixel, of which j is equal to or smaller than k and of which the domain structure is different from those of adjacent pixels.

Figure 4:
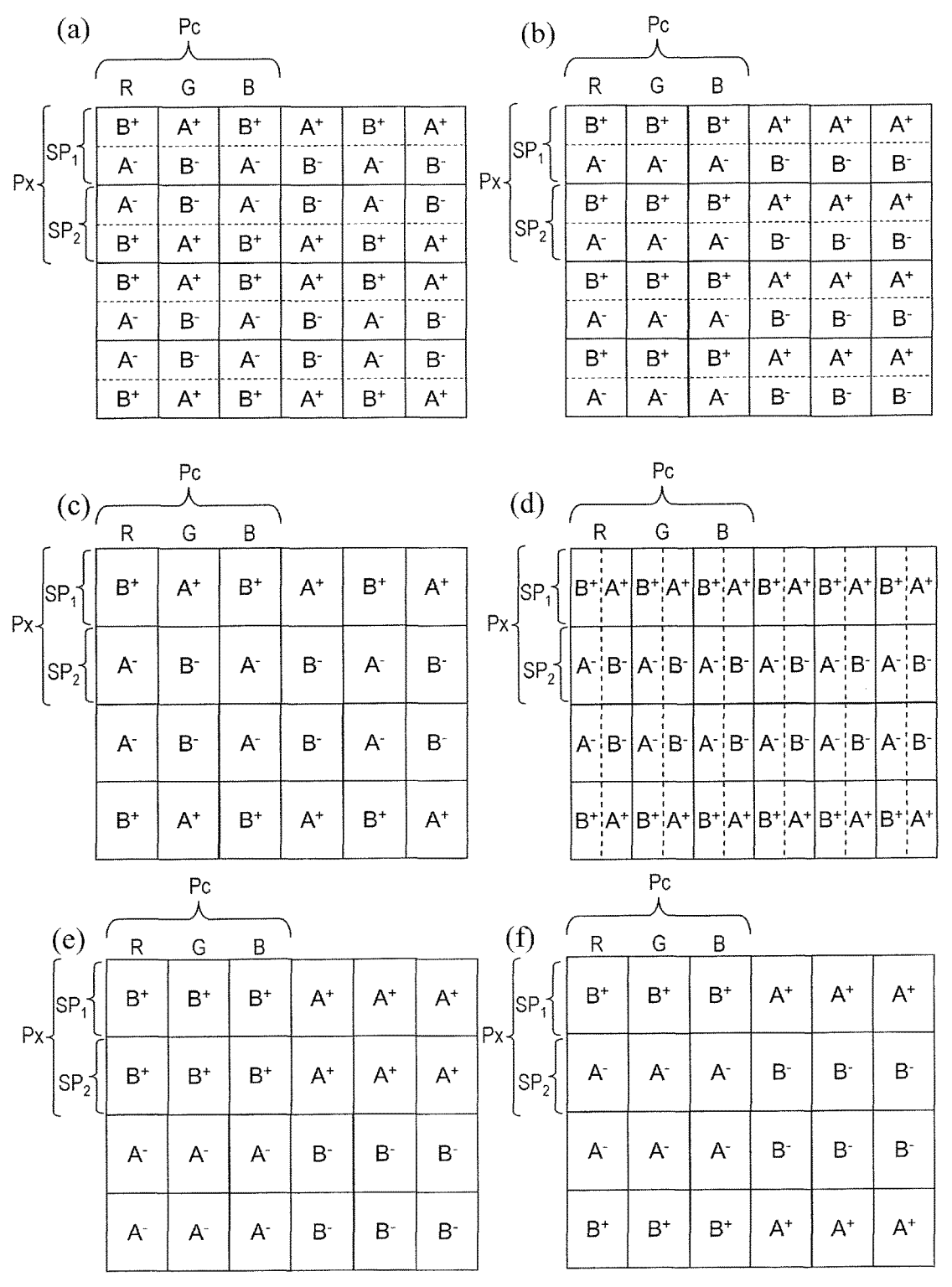

In the domain arrangement of the liquid crystal display device shown in FIG. 4(a) (where j=2, k=2 and m=4), each pixel Px is comprised of two subpixels $SP_1$ and $SP_2$ which are arranged vertically. And each of those two subpixels $SP_1$ and $SP_2$ is further split into two kinds of domains.

Now take a look at the subpixel $SP_1$ of the pixel Px (R pixel) at the upper left corner. This subpixel $SP_1$ is comprised of domains $B^+$ and $A^-$, the number j of the kinds of domains that form this subpixel $SP_1$ is two, and those two domains are arranged vertically. Also, the respective areas of these domains $B^+$ and $A^-$ are equal to each other. The other subpixel $SP_2$ of the pixel Px (R pixel) at the upper left corner is comprised of domains $A^+$ and $B^-$, the number j of the kinds of domains that form this subpixel $SP_2$ is two, and those two domains are arranged vertically. Also, the respective areas of these domains $A^+$ and $B^-$ are equal to each other, and also equal to the areas of the domains $B^+$ and $A^-$.

The domain arrangement shown in FIG. 4(a) is obtained by adopting the domain arrangement of the two pixels Px that are adjacent to each other in the column direction in FIG. 2(d) as that of these two subpixels $SP_1$ and $SP_2$. In the liquid crystal display device shown in FIG. 4(a), each pixel Px is comprised of two kinds of domains (i.e., k=2), and each of the two subpixels $SP_1$ and $SP_2$ included in each pixel Px includes two kinds of domains (i.e., j=2). Also, two pixels Px that are adjacent to each other in the row direction have mutually different domain structures, and form a group of pixels consisting of four kinds of domains $B^+$, $A^-$, $A^+$ and $B^-$. Consequently, a single color display pixel Pc naturally includes four kinds of domains $B^+$, $A^-$, $A^+$ and $B^-$, too (i.e., m=n=4).

Next, look at the pixels representing the same color in two color display pixels that are adjacent to each other in the row direction. For example, compare the domain structure of the pixel (R pixel) Px at the upper left corner shown in FIG. 4(a) to that of the pixel (R pixel) located on the same row and on the fourth column. The subpixel SP$_1$ of the pixel (R pixel) Px at the upper left corner is comprised of domains B$^+$ and A$^-$, while the subpixel SP$_1$ of the pixel (R pixel) on the same row and on the fourth column is comprised of domains A$^+$ and B$^-$. That is to say, the respective subpixels SP$_1$ of these two closest pixels belonging to the same row and representing the same color include four kinds of domains. Likewise, the respective subpixels SP$_2$ of the two closest pixels belonging to the same row and representing the same color also include four kinds of domains. As can be seen, the liquid crystal display device shown in FIG. 4(a) satisfies the condition that in any two color display pixels that are adjacent to each other in the row direction, the set of subpixels that has a higher luminance (which will be referred to herein as "bright subpixels" and may be SP') than the other kind of subpixels includes n kinds of domains and that the areas of the n kinds of domains included in the set of subpixels that has the higher luminance (which will be referred to herein as "dark subpixels" and may be SP') than the other kind of subpixels are substantially equal to each other. Likewise, the liquid crystal display device shown in FIG. 4(a) satisfies the condition that in any two color display pixels that are adjacent to each other in the row direction, the set of subpixels that has a lower luminance (which may be SP$_2$) than the other kind of subpixels includes n kinds of domains and that the areas of the n kinds of domains included in the set of subpixels that has the higher luminance (which may be SP$_2$) than the other kind of subpixels are substantially equal to each other. Furthermore, the liquid crystal display device also satisfies the condition that in two color display pixels that are adjacent to each other in the row direction, the areas of four kinds of domains included in each set of pixels representing one of the primary colors are substantially equal to each other. Although the respective areas of the subpixels SP$_1$ and SP$_2$ are supposed to be equal to each other in this example, the conditions described above are also satisfied even if the respective areas of the subpixels SP$_1$ and SP$_2$ are different from each other. Alternatively, the bright and dark subpixels may be arranged in a checkerboard pattern. Still alternatively, the liquid crystal display device may also be driven so that the bright and dark subpixels are changed with each other every vertical scanning period.

The domain arrangement of the liquid crystal display device shown in FIG. 4(b) (where j=2, k=2, and m=2) is obtained by adopting the domain arrangement of the two pixels Px that are adjacent to each other in the column direction in FIG. 3(c) as that of two subpixels SP$_1$ and SP$_2$.

The domain arrangement of the liquid crystal display device shown in FIG. 4(c) (where j=1, k=2, and m=4) is obtained by adopting the domain arrangement of the two pixels Px that are adjacent to each other in the column direction in FIG. 2(f) as that of two subpixels SP$_1$ and SP$_2$.

The domain arrangement of the liquid crystal display device shown in FIG. 4(d) (where j=2, k=4, and m=4) is obtained by adopting the domain arrangement of the two pixels Px that are adjacent to each other in the column direction in FIG. 2(b) as that of two subpixels SP$_1$ and SP$_2$.

The domain arrangement of the liquid crystal display device shown in FIG. 4(e) (where j=1, k=1, and m=1) is obtained by splitting each pixel Px of the domain arrangement shown in FIG. 3(d) into subpixels SP$_1$ and SP$_2$. As can be seen, in a situation where n=4, even if k=1 and j=1, a group of color display pixels, of which the number of kinds of domains that form mutually adjacent color display pixels Pc that are arranged in two rows and two columns is four, can also be formed.

The domain arrangement of the liquid crystal display device shown in FIG. 4(f) (where j=1, k=2, and m=2) is obtained by splitting each pixel Px of the domain arrangement shown in FIG. 3(c) into subpixels SP$_1$ and SP$_2$.

The domain arrangement of the liquid crystal display device shown in FIG. 5(a) (where j=2, k=2, and m=4) is obtained by adopting the domain arrangement of the two pixels Px that are adjacent to each other in the column direction in FIG. 2(c) as that of two subpixels SP$_1$ and SP$_2$.

The domain arrangement of the liquid crystal display device shown in FIG. 5(b) (where j=2, k=2, and m=4) is obtained by adopting the domain arrangement of the two pixels Px that are adjacent to each other in the column direction in FIG. 3(b) as that of two subpixels SP$_1$ and SP$_2$.

As can be seen, even if a configuration in which the number of alignment division is set to be less than four with respect to subpixels and pixels is adopted for a liquid crystal display device with the pixel division structure, the display luminance can also be increased with the deterioration in viewing angle characteristic minimized.

In each of the various examples of liquid crystal display devices described above, each color display pixel is supposed to be comprised of three-primary-color pixels (i.e., R, G and B pixels). However, this is only an example of the present invention. And the present invention is naturally applicable to a liquid crystal display device in which each color display pixel is comprised of four or more primary color pixels. Also, the pixel arrangement does not have to be the vertical striped arrangement described above, but may also be any of various other arrangements such as a horizontal striped arrangement and a pentile arrangement. Generally speaking, the larger the number of primary color pixels that form a single color display pixel, the larger the number of domains to be produced in a single color display pixel and the larger the number of dark lines produced in the boundary between the domains. Consequently, the larger the number of primary color pixels, the lower the display luminance and the more significant the effect to be achieved by applying the present invention would be.

Next, some examples of suitable domain arrangements for a liquid crystal display device with four-primary-color color display pixels will be described with reference to FIGS. 6 and 8.

FIGS. 6(a) through 6(d) illustrate four exemplary domain arrangements for a liquid crystal display device (with four-primary-color color display pixels) as an embodiment of the present invention. In the liquid crystal display device shown in FIGS. 6(a) through 6(d), each color display pixel Pc is comprised of R, G, B and Ye (yellow) pixels. These primary color pixels are arranged in stripes.

In the domain arrangement of the liquid crystal display device shown in FIG. 6(a) (where k=2 and m=4), two color display pixels Pc that are adjacent to each other in the row direction each include four kinds of domains B$^+$, A$^-$, A$^+$ and B$^-$ as in the domain arrangement shown in FIG. 2(a).

Now take a look at the color display pixel Pc at the upper left corner in FIG. 6(a), and it can be seen that the pixel (R pixel) on the first column is made up of domains B$^+$ and A$^-$, the pixel (G pixel) on the second column is made up of domains A$^+$ and B$^-$, the pixel (B pixel) on the third column has the same domain structure as the pixel (R pixel) on the first column, and the pixel (Ye pixel) on the fourth column has the same domain structure as the pixel (G pixel) on the second column. Next, look at the color display pixel which is adjacent to this color display pixel in the row direction, and it can be seen that the pixel (R pixel) on the fifth column is made up of domains $A^+$ and $B^-$, the pixel (G pixel) on the sixth column is made up of domains $B^+$ and $A^-$, the pixel (B pixel) on the seventh column has the same domain structure as the pixel (R pixel) on the fifth column, and the pixel (Ye pixel) on the eighth column has the same domain structure as the pixel (G pixel) on the sixth column. As can be seen, these two color display pixels that are adjacent to each other in the row direction have mutually different domain structures. Unlike the color display pixel shown in FIG. 2(a) that consists of three columns (i.e., an odd number of columns), the color display pixel shown in FIG. 6(a) consists of four columns (i.e., an even number of columns). That is why if two kinds of domain structures were alternately arranged, then two color display pixels that are adjacent to each other in the row direction would have the same domain structure. Thus, to avoid such a situation, the pixel on the fourth column (i.e., the rightmost pixel of the color display pixel at the upper left corner) and the pixel on the fifth column (i.e., the leftmost pixel of the color display pixel that is adjacent to the former color display pixel on the right hand side) have the same domain structure. As a result, in two color display pixels that are adjacent to each other in the row direction, the respective primary color pixels have four kinds of domains.

The domain arrangement of the liquid crystal display device shown in FIG. 6(b) (where k=2 and m=2) is obtained by applying the domain arrangement shown in FIG. 2(b) to these four primary colors.

The domain arrangement of the liquid crystal display device shown in FIG. 6(c) (where k=2 and m=2) is obtained by applying the domain arrangement shown in FIG. 3(c) to these four primary colors.

The domain arrangement of the liquid crystal display device shown in FIG. 6(d) (where k=1 and m=1) is obtained by applying the domain arrangement shown in FIG. 3(d) to these four primary colors.

Next, another exemplary arrangement of four kinds of domains in a liquid crystal display device (with four-primary-color color display pixels) as an embodiment of the present invention will be described with reference to FIGS. 7(a) and 7(b).

Figure 7:
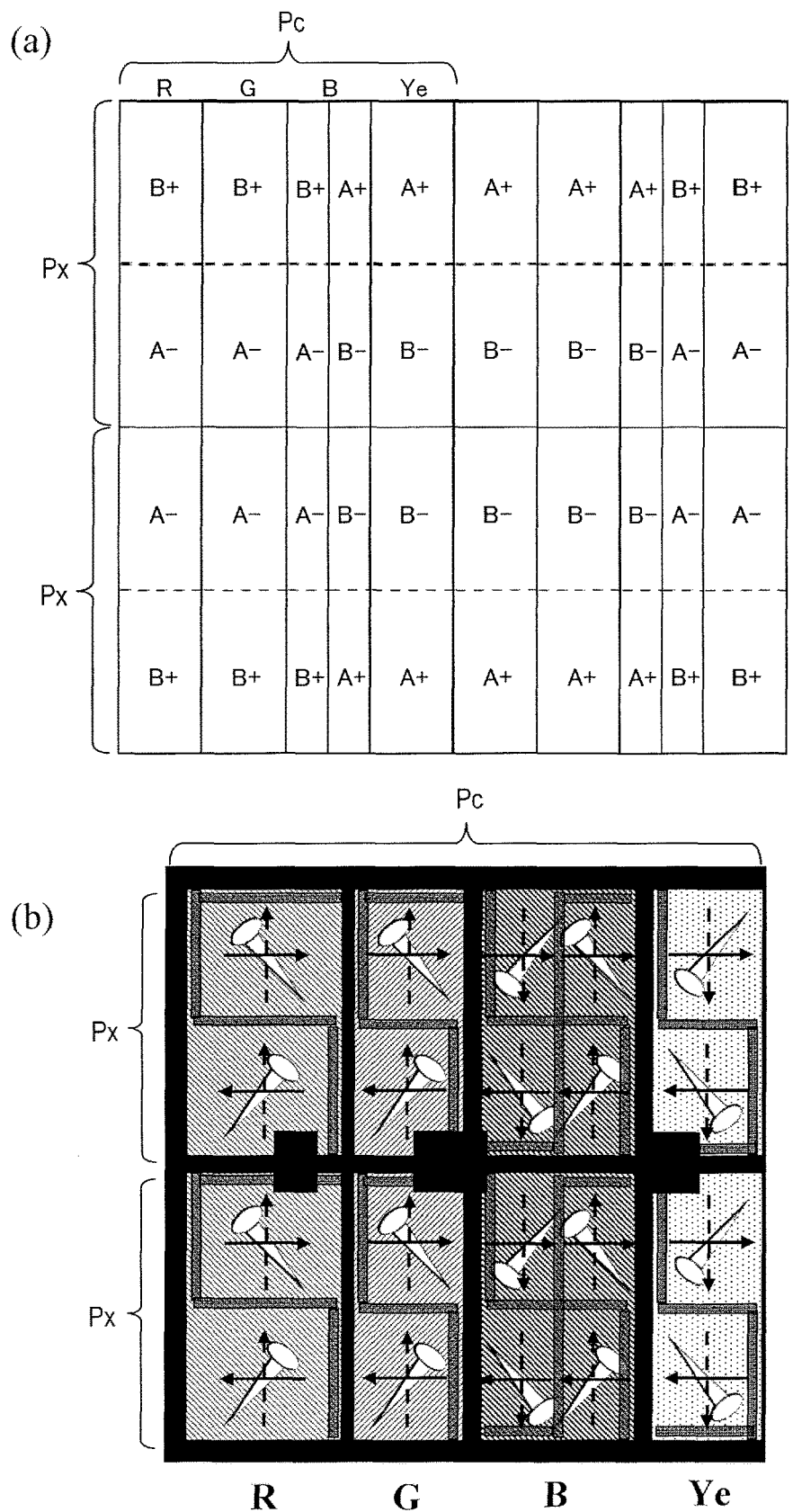
FIGS. 7 (a) and (b) illustrate other exemplary arrangements of four kinds of domains in a liquid crystal display device (with four-primary-color color display pixels) as an embodiment of the present invention.

If a single color display pixel Pc is comprised of four primary color pixels, namely, R, G, B and Ye pixels, the domain arrangement shown in FIGS. 7(a) and 7(b) is suitably adopted. FIGS. 7(a) and 7(b) illustrate another exemplary arrangement of four kinds of domains in a liquid crystal display device (with four-primary-color color display pixels) as an embodiment of the present invention, and illustrate an exemplary arrangement of domains for color display pixels Pc that are arranged in two rows and two columns. Particularly, in FIG. 7(b), the pretilt directions produced by the alignment treatment are indicated by arrows and the pretilt directions of liquid crystal molecules are indicated by nails. More specifically, the dashed arrow indicates the pretilt direction on the lower substrate, and the solid arrow indicates the pretilt direction on the upper substrate. In FIG. 7(b), also shown are dark lines produced between the domains and the black matrix.

As shown in FIGS. 7(a) and 7(b), if a single color display pixel Pc is comprised of four kinds of domains (i.e., if m=4), the B pixel may be comprised of four kinds of domains (i.e., $k_B$=4) but each of the other primary color pixels (i.e., R, G and Ye pixels) may be comprised of only two kinds of domains (i.e., $k_R$=$k_G$=$k_{Ye}$=2). In that case, the two kinds of domains ($B^+$ and $A^-$) included in the R pixel are suitably the same as the two kinds of domains included in the G pixel, and the two kinds of domains ($A^+$ and $B^-$) included in the Ye pixel are suitably different from the two kinds of domains included in the R and G pixels. That is to say, the R, G and Ye pixels suitably include all of those four kinds of domains. R and G can represent Ye by additive mixture of colors, and therefore, the color represented by the R and G pixels is close to the color represented by the Ye pixel. That is why by arranging the domains so that these three primary color pixels include all of the four kinds of domains, the luminance can be increased almost without causing deterioration in viewing angle characteristic. The same configuration may also be adopted even if C (cyan) or M (magenta) pixel is used instead of the Ye pixel. However, the effect of increasing the luminance can be achieved most significantly by using the Ye pixel.

FIGS. 8(a) through 8(d) illustrate other exemplary arrangements of four kinds of domains in a liquid crystal display device (with four-primary-color color display pixels) as an embodiment of the present invention. In the liquid crystal display device shown in FIGS. 8(a) through 8(d), each color display pixel Pc is comprised of R, G, B and W (white) pixels. These primary color pixels are arranged in a pentile pattern. That is to say, four primary color pixels Pc that are arranged in two rows and two columns form a single color display pixel Pc.

In the domain arrangement of the liquid crystal display device shown in FIG. 8(a) (where k=2 and m=2), two color display pixels Pc that are adjacent to each other in the row direction each include four kinds of domains $B^+$, $A^-$, $A^+$ and $B^-$ as in the domain arrangement shown in FIG. 3(c).

The domain structure of each pixel on the first row of the liquid crystal display device shown in FIG. 8(b) (where k=2 and m=2) is quite the same as that of an associated pixel on the first row of the liquid crystal display device shown in FIG. 8(a). However, the domain structure of each pixel on the second row of the liquid crystal display device shown in FIG. 8(b) is different from that of an associated pixel on the second row of the liquid crystal display device shown in FIG. 8(a). Specifically, the vertical arrangement of the two kinds of domains $B^+$ and $A^-$ that each pixel on the second row has in the liquid crystal display device shown in FIG. 8(b) is the inverse of the vertical arrangement of the two kinds of domains $B^+$ and $A^-$ that each pixel on the second row has in the liquid crystal display device shown in FIG. 8(a). As a result, the alignment treatment to make the liquid crystal display device shown in FIG. 8(b) needs to be carried out on a pixel basis in both the row direction and the column direction. As for the uppermost and/or lowermost row(s), however, the alignment treatment needs to be carried out on a two pixel basis in the row direction and on a half pixel basis in the column direction as already described for the liquid crystal display device shown in FIG. 2(b).

The domain arrangement of the liquid crystal display device shown in FIG. 8(c) (where k=1 and m=2) is obtained by modifying the domain arrangement shown in FIG. 3(d) in which the domains change their kinds every three columns so that the domains change their kinds every two columns. In the liquid crystal display device shown in FIG. 8(c), however, four pixels Px that are arranged in two rows and two columns form a single color display pixel Pc, and therefore, two color display pixels Pc that are adjacent to each other in the row direction include four kinds of domains.

The domain arrangement of the liquid crystal display device shown in FIG. 8(d) (where k=1 and m=1) is obtained by applying the domain arrangement shown in FIG. 3(d) to an arrangement in which a single color display pixel Pc is comprised of four pixels that are arranged in two rows and two columns. That is to say, a single color display pixel Pc consisting of three pixels Px that are arranged in one row and three columns in FIG. 3(d) is replaced with a single color display pixel Pc consisting of four pixels Px that are arranged in two rows and two columns in FIG. 8(d). Specifically, the domain arrangement of the liquid crystal display device shown in FIG. 8(d) is obtained by modifying the domain arrangement shown in FIG. 3(d) in which the domains change their kinds every three columns into a domain arrangement in which the domains change their kinds every two columns and by splitting each row shown in FIG. 3(d) into two. In the domain arrangement of the liquid crystal display device shown in FIG. 8(d), color display pixels that are arranged in two rows and two columns include four kinds of domains as in the domain arrangement shown in FIG. 3(d).

In the example described above, the director azimuths of the four kinds of domains $A^+$, $B^+$, $A^-$ and $B^-$ shown in FIG. 1 are supposed to be 135, 225, 315 and 45 degrees, respectively (such a combination will be referred to herein as "VATN-1" (see FIG. 1)). However, this is just an exemplary arrangement of the four kinds of domains. If the horizontal and vertical directions on the display screen are supposed to be X- and Y-axes, respectively, and if the four kinds of domains $A^+$, $B^+$, $A^-$ and $B^-$ shown in FIG. 1 are arranged in the first, second third and fourth quadrants, respectively, the relation between the positions of the respective domains and the director azimuths can be represented by the following Table 1. Just like VATN-1, VATN-2, VATN-3 and VATN-4 shown in Table 1 can also be obtained by performing mask exposures four times in the optical alignment treatment process as disclosed in Patent Document No. 3. Specifically, VATN-1 and VATN-2 are obtained by performing the optical alignment treatment shown in FIGS. 2(a) and 2(b) of Patent Document No. 3, and VATN-3 and VATN-4 are obtained by performing the optical alignment treatment shown in FIGS. 3(a) and 3(b) of Patent Document No. 3.

Meanwhile, a PSA mode liquid crystal display device suitably includes a pixel electrode, which is made up of a crossed trunk portion and a plurality of branch portions that are extended from the trunk portion to run in substantially 45 degree direction, as disclosed in Patent Document No. 7. The crossed trunk portion is arranged so as to be parallel to the directions of the polarization axes of two polarizers that are arranged as crossed Nicols. The four domains produced in this case are suitably arranged as indicated by PSA-1 in the following Table 1:

TABLE 1

| Type of arrangement | First quadrant | Second quadrant | Third quadrant | Fourth quadrant |
|---|---|---|---|---|
| VATN-1 | 135 degrees | 225 degrees | 315 degrees | 45 degrees |
| VATN-2 | 315 degrees | 45 degrees | 135 degrees | 225 degrees |
| VATN-3 | 225 degrees | 135 degrees | 45 degrees | 315 degrees |
| VATN-4 | 45 degrees | 315 degrees | 225 degrees | 135 degrees |
| PSA-1 | 45 degrees | 135 degrees | 225 degrees | 315 degrees |

In the foregoing description, embodiments of the present invention have been described as being implemented as a VATN mode liquid crystal display device. Hereinafter, domain arrangements for MVA, FPA, and SS-VA mode liquid crystal display devices as other embodiments of the present invention will be described with reference to FIG. 9. FIG. 9(a) illustrates an exemplary arrangement of four kinds of domains for MVA, FPA and SS-VA mode liquid crystal display devices according to embodiments of the present invention. On the other hand, FIG. 9(b) illustrates an exemplary arrangement of four kinds of domains for conventional MVA, FPA and SS-VA mode liquid crystal display devices.

As shown in FIG. 9(b), in the conventional MVA, FPA and SS-VA mode liquid crystal display devices, four kinds of domains are defined by slits (i.e., openings cut through electrodes) or ribs (i.e., dielectric projections arranged on electrodes) that run linearly so as to split into two the polarization axes (e.g., horizontal and vertical axes, in this example) of two polarizers that are arranged as crossed Nicols. In this manner, four kinds of domains are defined in each of the three primary color pixels R, G and B.

On the other hand, in the domain arrangement of the liquid crystal display device of this embodiment shown in FIG. 9(a) (where k=2 and m=2), each pixel is comprised of two kinds of domains and two color display pixels Pc that are adjacent to each other in the column direction include four kinds of domains. In an MVA mode liquid crystal display device, the alignment azimuths of liquid crystal molecules are defined by slits or ribs that run linearly, and therefore, either domains $A^+$ and $A^-$ or domains $B^+$ and $B^-$ are defined on both sides of a single slit or rib. That is why such a liquid crystal display device cannot have a domain arrangement in which k=1.

Although a suitable domain arrangement for a VA mode liquid crystal display device (where n=4) has been described as an example, the same statement also applies to the IPS mode liquid crystal display device shown in FIG. 11(a) and to the FFS mode liquid crystal display device shown in FIG. 11(b) as described above. In that case, n=2, and the device may be configured so that each pixel is comprised of a single kind of domain and that either two adjacent pixels or two adjacent color display pixels include two kinds of domains.

According to the present invention, the display luminance can be increased with deterioration in viewing angle characteristic minimized. Consequently, a liquid crystal display device according to the present invention can be used effectively as a 3D display device.

INDUSTRIAL APPLICABILITY

The present invention can be used in various types of liquid crystal display devices.

REFERENCE SIGNS LIST

Px pixel (primary color pixel)
Pc color display pixel
$SP_1$, $SP_2$ subpixel

The invention claimed is:
1. A liquid crystal display device comprising a display area that includes a plurality of pixels,
   wherein the display area is made up of n kinds of domains (where n is an integer that is equal to or greater than two and equal to or smaller than four), the directors of the n kinds of domains defining mutually different alignment directions, and
   wherein if the domain structure of each said pixel is defined by the kinds of the domains that form the pixel, the number k of the kinds of the domains that form the pixel, and the arrangement of the domains in the pixel, the display area includes a pixel, of which k is less than n and of which the domain structure is different from the domain structures of adjacent pixels, wherein each of the plurality of pixels is comprised of two or more subpixels that exhibit mutually different luminances at least when displaying a certain half scale tone, and wherein each of the two or more subpixels is comprised of at least one domain, and wherein if the domain structure of each said subpixel is defined by the kinds of the domains that form the subpixel, the number j of the kinds of the domains that form the subpixel, and the type of the arrangement of the domains in the subpixel, the plurality of pixels include a pixel, of which j is equal to or smaller than k and of which the domain structure is different from the domain structures of adjacent pixels.

2. The liquid crystal display device of claim 1, wherein the plurality of pixels are arranged in rows and columns to form a matrix pattern, and include a group of pixels in which the number of the kinds of the domains that form mutually adjacent pixels that are arranged in two rows and two columns is n.

3. The liquid crystal display device of claim 1, wherein the plurality of pixels are arranged in rows and columns to form a matrix pattern, and include a group of pixels in which the number of the kinds of the domains that form two mutually adjacent pixels is n.

4. The liquid crystal display device of claim 1, wherein the liquid crystal display device operates in one of VATN, MVA, PSA, FPA, SS-VA, IPS, FFS and blue phase modes.

5. The liquid crystal display device of claim 1, wherein a set of subpixels that have the highest luminance in the two or more subpixels has n kinds of domains, the areas of the n kinds of domains, included in the set of subpixels having the highest luminance in the two or more subpixels, being substantially equal to each other.

6. The liquid crystal display device of claim 1, wherein a set of subpixels that have the lowest luminance in the two or more subpixels has n kinds of domains, the areas of the n kinds of domains, included in the set of subpixels having the lowest luminance in the two or more subpixels, being substantially equal to each other.

7. The liquid crystal display device of claim 1, wherein the areas of the n kinds of domains that form the display area are substantially equal to each other.

* * * * *